May 6, 1930.  J. J. WHARAM  1,757,493
DIAL ILLUMINATION
Filed May 31, 1928
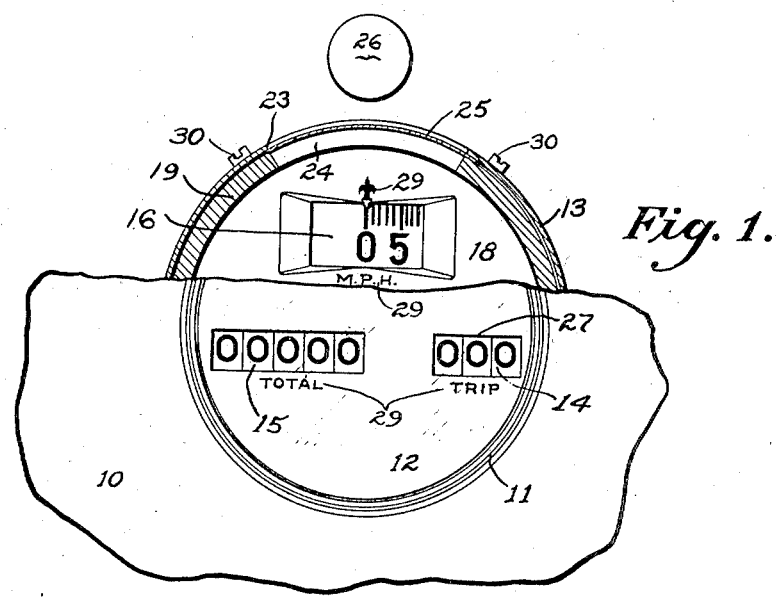
Fig. 1.
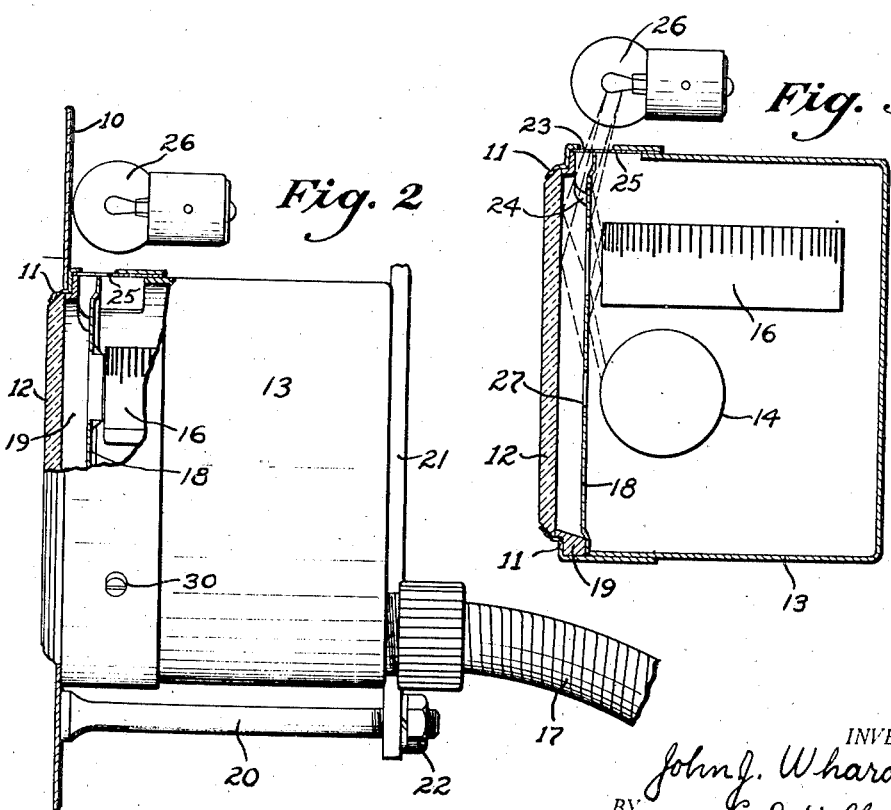
Fig. 2.
Fig. 3.
INVENTOR.
John J. Wharam.
BY C. R. Halbert.
E. L. Davis.
ATTORNEYS.

Patented May 6, 1930

1,757,493

UNITED STATES PATENT OFFICE

JOHN J. WHARAM, OF DETROIT, MICHIGAN, ASSIGNOR TO FORD MOTOR COMPANY, OF FORDSON, MICHIGAN, A CORPORATION OF DELAWARE

DIAL ILLUMINATION

Application filed May 31, 1928. Serial No. 281,683.

The object of my invention is to provide a novel means for illuminating dials for instruments whereby these dials may be visible at night.

Still a further object of my invention, is to provide illumination for dials of the type having a dial plate with indicating characters thereon and openings through the dial plate through which recording or indicating dials are visible.

Still a further object of my invention, is to provide illumination for instrument dials having a dial plate with openings therein through which recording or indicating dials are visible, wherein the illumination may be by indirect or reflected light, and wherein both the dial plate and the indicating or recording dials may be illuminated properly.

In connection with the dials of the type mentioned, such for instance as are used in connection with the speedometer used on automobiles, it was formerly the custom to illuminate these dials by a dash lamp which extended out from the instrument board of the automobile, so that a direct light shown on the front of the dial, and the dial plate and the recording dial were both clearly illuminated. Recently, however, the dash light extending out from the instrument board has been largely eliminated by the adoption of what is termed "indirect lighting."

With the "indirect lighting," windows are left in the sides of the instruments on the instrument board, the bezels of these instruments are set in practically flush with the surface of the instrument board, and the dash light is set back of the instrument board in such position that its light may shine through the windows in the sides of the instruments. The lights are so arranged that the light from the dash lamp shines through the windows and onto the under surface of the glass of the instrument at such an angle that the light is reflected by this glass onto the dials of the instrument.

This form of lighting is very satisfactory for any type of instrument having a dial plate with a recording or indicating hand extended out in front of the dial plate, but has proven rather unsatisfactory for the type of instruments such as speedometers where the dial plate has openings therein through which the recording or indicating dials are visible, as the reflected light from the instrument glass is not reflected at such an angle that it will reflect through the openings in the dial plate onto the recording or indicating dials.

The object of this invention is to illuminate both the dial plate and the recording or indicating dials clearly by the indirect lighting method.

Still a further object of my invention is to provide an instrument having a case with a window in the side thereof and having the dial plate disposed between the edges of said window so that the light from the dash lamp may shine both on the back of the dial plate and also on the instrument glass so that the light may be reflected both on the dial plate from the glass and on the recording or indicating dials from the back of the dial plate.

With these and other objects in view, my invention consists in the arrangement, construction, and combination of the various parts of my improved device, as described in the specification, claimed in the claims, and illustrated in the accompanying drawings, in which:

Figure 1 shows a front elevation of an instrument board having a speedometer installed therein, parts being broken away to better illustrate the construction.

Figure 2 shows a vertical longitudinal central sectional view of the speedometer shown in Figure 1, and Figure 3 shows a diagrammatic view on the same sectional line indicating the manner in which the dials are illuminated by means of the reflected light from the dash lamp.

Referring to the accompanying drawing I have used the reference numeral 10 to indicate generally the instrument board upon which the instrument having my improved illumination for its dial is mounted.

This instrument board 10 has an opening therein designed to receive the bezel ring 11 of the instrument. In the form of device herein disclosed, a speedometer is illustrated, but it will be understood that my invention may be applied to any instrument having a similar arrangement of the dial plate and recording or indicating dials.

Mounted in the bezel ring 11 is the glass 12. The speedometer head has a cup shaped case 13 designed to contain the trip mileage dial 14, the total mileage dial 15, and the speedometer dial 16.

Suitable operating mechanism, (not shown) is provided for operating these dials and this mechanism is connected through a speedometer cable 17 with any rotating part of an automobile.

A dial plate 18 is set on the edge of the case 13. A spacing ring 19 is disposed between the dial plate 18 and the glass 12 so that when the bezel ring 11 is secured to the case 13 by suitable means, such as screws 30, then the glass and bezel plate and dial plate and case will all be held in assembled position with the glass spaced from the dial plate 18. In the form of the device herein shown the speedometer head is held in its place in the instrument panel with the bezel plate 11 entering the opening therein and forming a stop against the underside of the instrument board by means of studs 20 extended from the panel. A plate or clip 21 is clamped against the rear of the case 13 by a nut 22 on the end of the stud 20 so that the speedometer head is thereby held in place against the instrument panel.

The bezel ring 11 is provided with a central longitudinal slot 23 at the top thereof and the spacing ring 19 is provided with a slot 24 registering with the slot 23. A transparent member 25 made from celluloid or other suitable material is clamped between the bezel ring and the case 13 in position covering said slots 23 and 24 whereby this member 25 may form a window through which light from a dash lamp 26 may be admitted to the interior of instrument. The parts are so dimensioned and placed that the dial plate 18 bisects the window 25 so that part of the light from the lamp 26 passing through this window shines on the rear surface of the glass and part shines on the rear surface of the dial plate 18. The dial plate 18 is of course provided with indicating characters 29 on the front to indicate what the dials 14, 15 and 16 show and is provided with some means to make it reflecting on its rear surface so that the light coming through the window 25 will be reflected onto the dials 14, 15 and 16. In the form of device here shown, the underside of the dial 18 is given a white satin finish as this has been found in connection with the speedometer dial to give the best lighting effect. The bezel ring is secured in place by screws 30.

It will be noted that the dials 14, 15 and 16 are each placed back from the dial plate 18. It will be noted that this construction is substantially necessary as it is not practical to place the dials too close to the dial plate and the appearance of the instrument is enhanced by setting these dials back somewhat from the dial plate. Referring to the diagrammatic showing in Figure 3, it will be seen that no light rays coming from the lamp 26 and passing through the window 25 will be reflected from the glass back through the slots 27 in the dial plate 18 onto the dials 14, 15 and 16. To change the position of the dash lamp would be a serious inconvenience and to change the position of the speedometer parts would seriously mar the appearance of the speedometer head. If the light were applied only to the glass, it will therefore be seen that there will be no direct or reflected rays on the dials 14, 15 and 16 but instead there will only be some diffused light on the dials so that the illumination is not satisfactory with only the indirect light from the speedometer glass.

With my improved device, however, the light from the dash lamp passes through the window 25 both on to the back of the dial plate 18 and the back of the glass so that both the face of the dial plate is illuminated and also the significant figures on the dials 14, 15 and 16.

The light received by the dial plate and the recording dials can be nicely varied by varying the proportion of the window 25 which is in front of the dial plate as compared with the amount to the rear of the dial plate.

Among the many advantages resulting from the use of my improved device it should be especially pointed out that the illumination of the instrument dial plate and dials can be insured and proportioned to give the best possible lighting effect. Further this is accomplished without the addition of any part or cost with regard to the equipment now generally used for similar instruments.

Some changes may be made in the arrangement and construction of the various parts of my improved device without departing from the spirit of my invention, and it is my intention to cover by my claims such changes as may reasonably be included within the scope thereof.

I claim as my invention:

1. In a device of the character described, an instrument having a cup shaped housing, a glass, a dial plate, said dial plate being mounted on the edges of said cup member, a spacing ring mounted on said dial plate, the glass being disposed on the spacing ring, and a bezel ring adapted to secure the glass and spacing ring and dial plate in place on the casing, the spacing ring and the casing having registering slots therein, whereby light may be admitted to the interior, both in front and in rear of the dial plate.

2. In a device of the character described, an instrument housing having a transparent glass face enclosing the front thereof, a dial in said housing, a dial plate mounted in said housing between the dial and face, and a window in the side of said housing admitting light to the rear faces of both the glass face and the dial plate, which light will be reflected therefrom to the front faces of the dial plate and dial.

3. In a device of the character described, an instrument panel, an instrument case mounted in said panel, a cover glass enclosing the front of said case, dials disposed within said case, a dial plate mounted between said dials and cover glass, and a window formed in the side of said case in position so that light from a single source disposed behind the instrument panel and projected through the window will strike the back of the dial plate and be reflected onto the dials and will strike the back of the cover plate and be reflected onto the front of the dial plate.

4. In a device of the character described, an instrument case, a cover glass enclosing the front of said case, a dial disposed within said case, a dial plate mounted between said dial and cover glass, and a window formed in said case in position so that light from an outside source projected through the window will strike the back of the dial plate and be reflected onto the dial and will strike the back of the cover glass and be reflected onto the front of the dial plate.

JOHN J. WHARAM.